United States Patent Office 3,093,254
Patented June 11, 1963

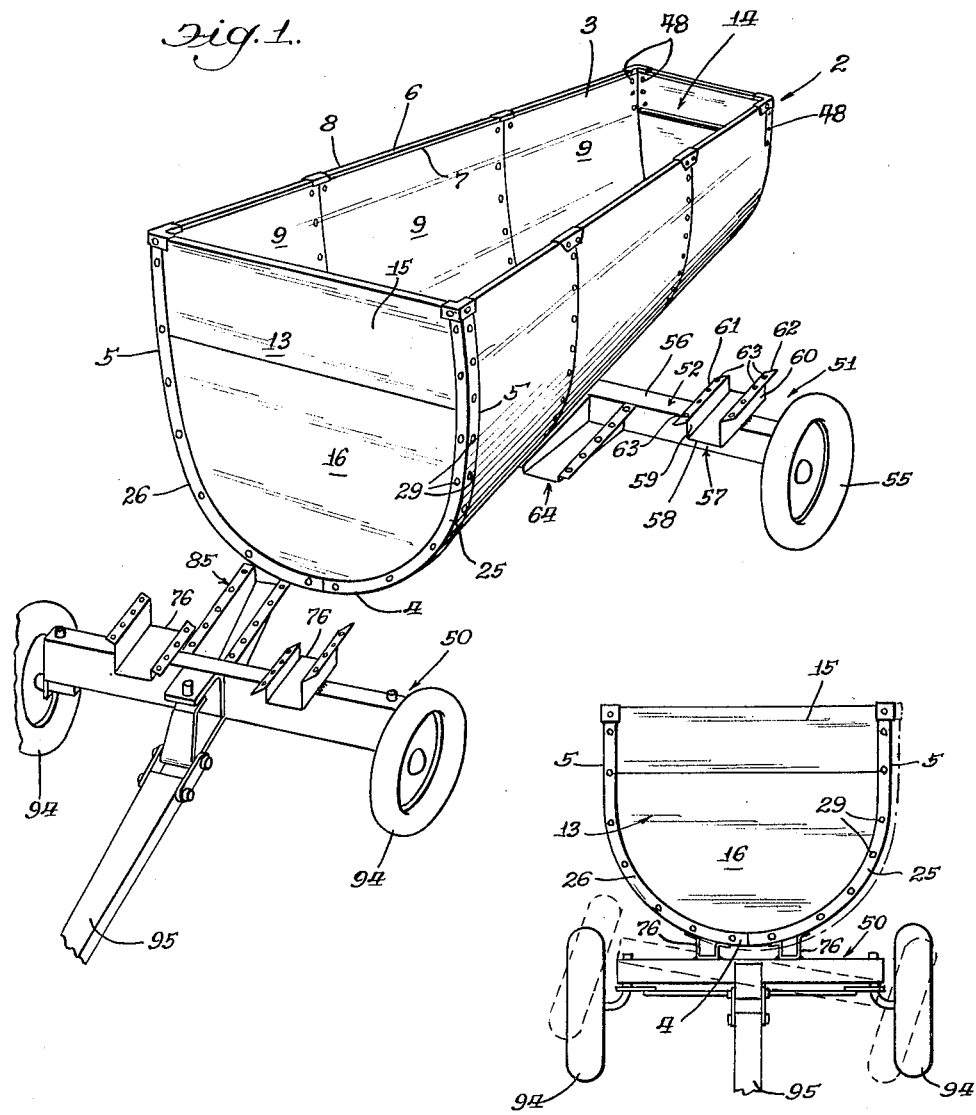

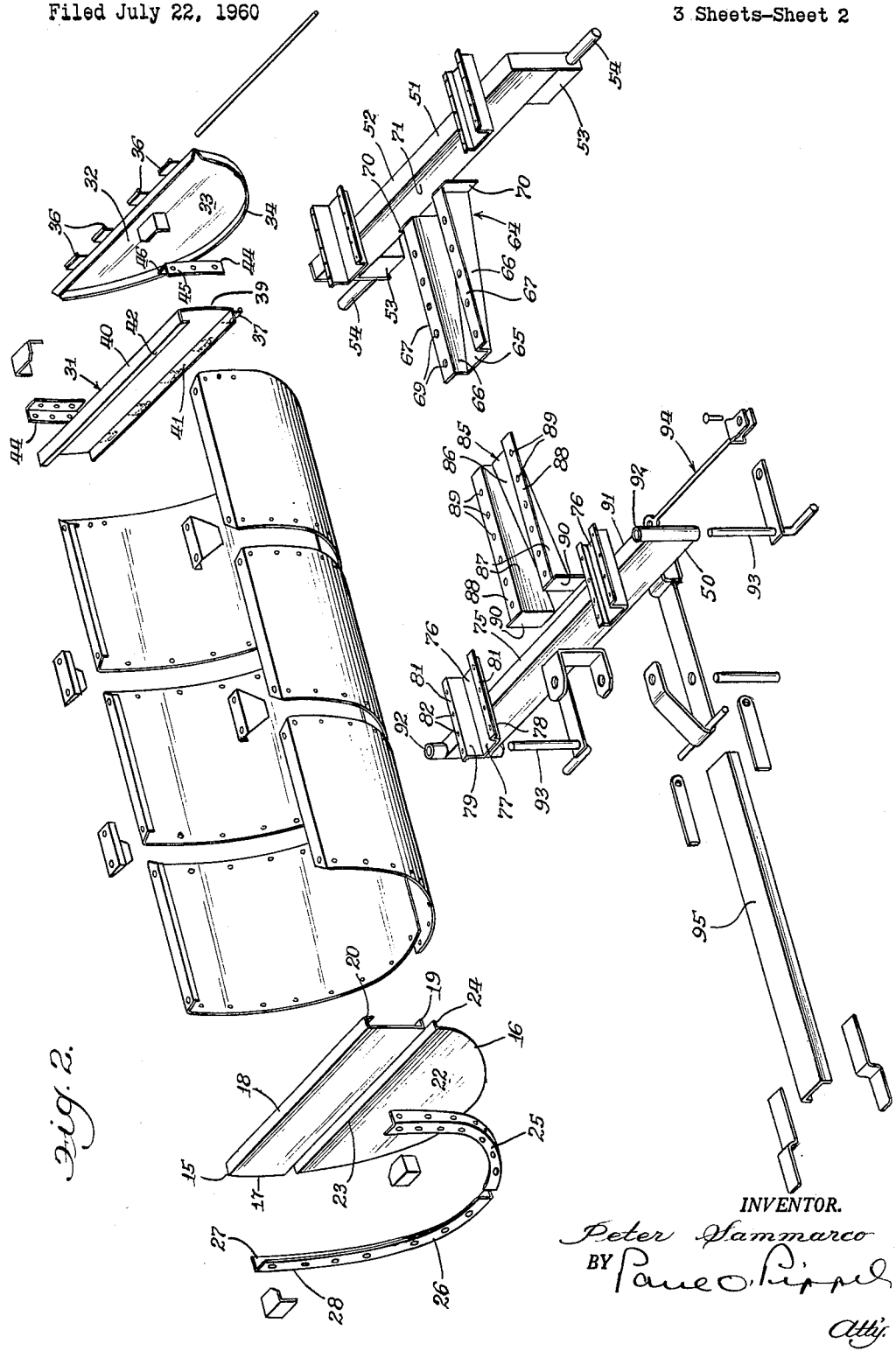

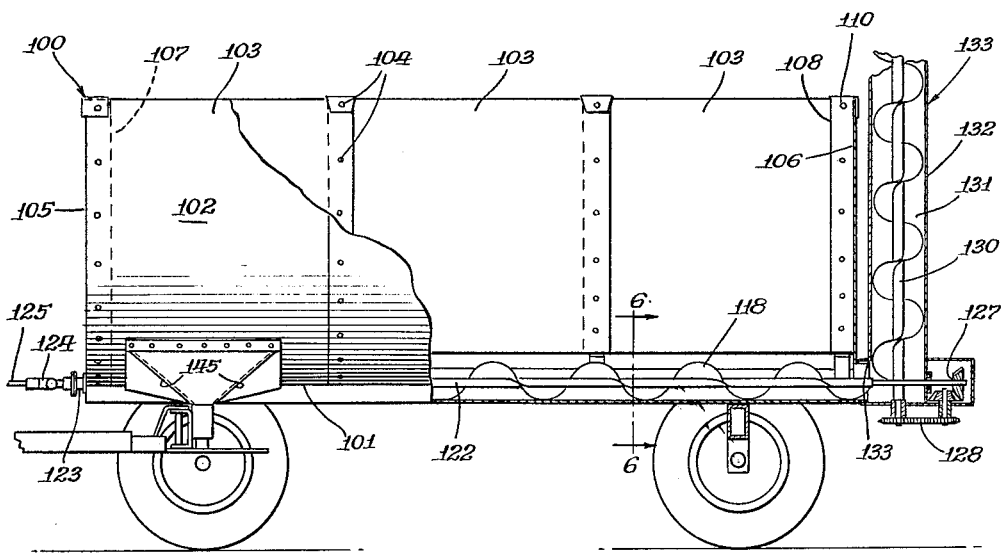
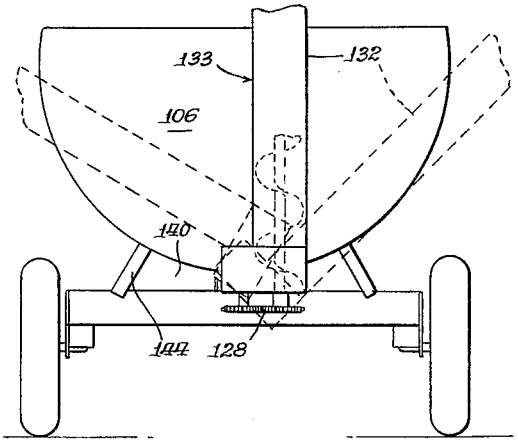
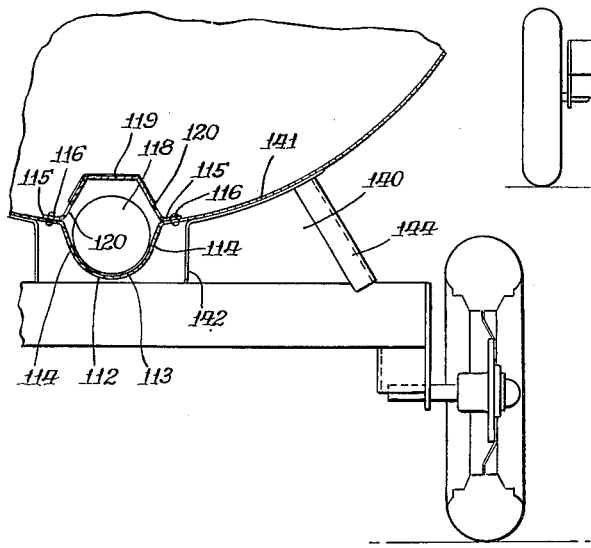

3,093,254
FRAMELESS GRAIN WAGON
Peter Sammarco, Bellwood, Ill., assignor to International Harvester Company, Chicago, Ill., a corporation of New Jersey
Filed July 22, 1960, Ser. No. 44,595
5 Claims. (Cl. 214—83.32)

This invention relates to wagons and more specifically to a wagon wherein the body is so constructed and arranged as to serve the function of the running gear in the manner of a reach structure between the front and rear wheel and axle assemblies.

The general object of the invention is to provide a novel, inexpensive and rugged wagon which utilizes a box structure of generally semi-cylindrical form extending between front and rear wheel and axle assemblies and wherein the box structure serves as a torsional facility between the front and rear wheels.

A more specific object of the invention is to provide a novel sheet steel box of trough form which is transversely curved intermediate its ends and which is mounted upon novel saddle arrangements on the front and rear wheel and axle assemblies, the connections between the front and rear axle assemblies and the box occurring in areas which provide maximum support for the box and accommodate torsional movements of the wheel and axle assemblies to permit the wagon to follow uneven terrain.

A further object of the invention is to provide a novel, flexible wagon wherein the box is formed and arranged to carry capacity loads and at the same time yieldably interconnect the assemblies.

In one embodiment of the invention the box is integrated with an auger trough which serves to confine an auger which is located at the bottom of the box, the contouring of the trough serving as a backbone for the box resisting its transverse collapse and at the same time being disposed immediately adjacent to the longitudinal median line of the wagon and so oriented as to enhance the flexibility of the wagon about the longitudinal axis.

These and other objects and advantages inherent in and encompassed by the invention will become more readily apparent from the specification and the drawings, wherein:

FIGURES 1 and 2 are exploded perspective views of one form of wagon incorporating the invention;

FIGURE 3 is an end view of the structure shown in FIGURE 1 with twisting motion being shown in phantom lines;

FIGURE 4 is a side-elevational view partially in longitudinal section of another form of the invention;

FIGURE 5 is a rear end view of the structure of FIGURE 4; and

FIGURE 6 is a cross-sectional view taken substantially on the line 6—6 of FIGURE 4.

Describing the invention in detail and having particular reference to FIGURES 1 and 2 of the drawings, there is shown a wagon generally designated 2 which comprises a grain box 3 of generally semi-cylindrical transverse contour comprising a curved bottom portion 4 which is convexed downwardly and which merges with the upright side portions 5, the upper edges of the side portions being formed with reinforcing, inwardly directed channels comprising upper and inboard flanges 6 and 7 of channels 8. It will be noted that the channels 8 of adjacent sections 9, 9 abut each other and that adjacent edge portions of the sections 9, 9 overlap and are secured together as by nut and bolt assemblies.

The ends of the box are closed by end walls or panels 13 and 14. The front panel is composed of upper and lower sections 15 and 16, the upper section being in the form of a channel member and comprising an upright web 17 and upper and lower inturned flanges 18 and 19, the inner edge of flange 18 merging into the dependent flange 20, the flanges 18 and 20 forming the top rail of the box similar to the rails for channels 8 of the side sections and being substantially coplanar therewith. The lower section comprises a substantially semi-circular panel or upright wall portion 22 and along its diametrical upper edge 23 is provided with an inturned substantially horizontal flange 24 which seats against the flange 19 and provides a transverse stiffening rib across the width or on the front end of the box.

The front edge of the box is reinforced by angle members 25 and 26 which are arcuately shaped and conform to the contour of the front edge of the box and comprise the angularly arranged flanges 27 and 28 which respectively overlap the outboard sides 5 and portions of the bottom and the forward side of the front wall 13. These reinforcing corner elements 25 and 26 are preferably secured to the sides 5 as well as to the front panel 13 by means of a series of bolts 29, 29.

The rear panel or wall structure 14 is also formed of upper and lower elements 31 and 32, the lower element being substantially semi-circular and comprising an upward upstanding panel 33 which has inturned circumferential or peripheral flange 34 and a diametrical inturned flange, there being provided along the diametrical edge 35 a plurality of hinge elements 36 by means of which the lower portion is secured to mating hinge element 37 along the lower edge of the upper portion 31 which is in the form of a channel member similar to the portion 15 and comprises an upright web 39 and inturned upper and lower flanges 40 and 41, flange 41 merging into a dependent flange 42, said flanges 40 and 42 forming the upper rail of the box and being substantially coplanar with the rails 8 of the side portions of the box. It will be seen that in this wall section that the corner members 44, 44 extend only the width of the upper portion 31 and their flanges 45 and 46 embrace the respective sides of the box and the panel portion 39 and are secured thereto as by bolts 48 extending therethrough. In this instance the limited extent of the brackets 44 is justified inasmuch as the flange 34 and the lower portion 32 serves to reinforce the lower portion of the rear part of the box.

The running gear comprises front and rear wheel and axle assemblies generally designated 50 and 51. The rear assembly includes a transverse box section bolster 52 which at each end is provided with dependent extensions 53 from which project outwardly wheel mounting spindles 54 which carry or rotatably journal the wheels 55. Adjacent to each end of the bolster 52 there is provided on the top side 56 thereof a saddle structure 57 which is substantially in the form of an inverted U and having a base portion 58 which seats on the top 56, the saddle extending forwardly and rearwardly of the bolster 51 and having a pair of laterally spaced upstanding inner and outer walls 59 and 60, the outer wall being slightly higher than the inner wall and the upper edges of the walls 59 and 60 having outturned flanges 61 and 62 which are formed to complementally engage with the underside structure or bottom portion 4 of the box. The flanges 61 and 62 are provided with suitable apertures 63 through which are passed a plurality of bolts or rivets which suitably connect the saddle to the adjacent side of the bottom portion 4. It will be seen that each saddle faces and supports the box above the bolster and that the saddles are disposed at opposite sides of the longitudinal center line of the box.

The rear bolster is also provided with a channel-shaped forwardly projecting reinforcing portion which extends from the center part of the rear bolster forwardly thereof and comprises a bottom web or wall 65 which slopes upwardly and forwardly toward the bottom 4 of the box and which at its lateral sides merges with the upstanding side flanges 66, 66 each of which is provided with an outturned upper flange 67 which lays against the underside of the box and is suitably connected thereto as by rivets and the like passing through the apertures 69. It will be seen that the rear end of the brace structure 64 is provided along the rear edges of the gusset webs 66 with laterally outwardly extending integral base flanges 70 which provide a broad seating area against the forward wall 71 of the box section rear bolster 51 and by means of which the brace is attached as by welding.

The front bolster is substantially similar to the rear bolster and also comprises a box section structure with a top web 75 which supports a pair of support saddles or brackets 76 located at opposite sides adjacent to the ends thereof. These saddles are in essence substantially identical with the saddles 57 and each comprises a base wall 77 which sits atop the top wall 75 and extends fore and aft with respect to the front bolster and merges with the upstanding inboard and outboard side flanges 78 and 79, the inboard flange being relatively shorter in depth than the flange 79 in view of the curvature of the bottom against which the upper ends of the flanges 78 and 79 seat with the outturned flanges 80 and 81 by means of which the saddles are attached through apertures 82 which receive rivets and the like which extend through the same and through suitable openings in the box structure as will be readily understood by those skilled in the art. Also the front bolster is provided intermediate its ends substantially centrally thereof with a channel-shaped rigidifying structure or brace element 85 which comprises a bottom wall 86 which slopes upwardly and rearwardly and merges with the upstanding gussets or side walls 87, 87 which at their upper ends are provided with the outturned flanges 88, said flanges 88 seating against the bottom side of the box and being connected thereto as by welding or by suitable securing means which pass through the openings 89 and through complementary openings in the bottom of the box. The forward end of the bracket structure 85 is provided with the lateral flanges 90 which merge with the forward ends of the side gussets 87 and with the rear ends of the side flanges 88, 88 and these flanges 90, 90 seat against the back side 91 of the front bolster and are secured thereto as by welding or the like. Thus it will be seen that the free span of the intermediate portion of the box is diminished and that there is substantial support for a large portion of the box and that the forces are so redistributed that the downward thrust or loads are redirected toward the front and rear bolsters and supported thereby. The opposite ends of the front bolster are provided with vertical sleeves 92, each of which admits the wheel mounting structure 93 which support the front wheels 94 turning movement, the same being controlled by means of the steering linkage generally designated 94 which is connected in the usual manner to the forward tongue 95 which is provided with a forward pitch in the usual manner for connection to an associated towing vehicle.

It will be realized that the essence of the invention is in the provision of a novel box structure which serves not only as the spanning member between the front and rear wheel and axle assemblies but which is so constructed as to yieldably resist deflections and at the same time structure being provided in the running gear in order to support and give adequate strength to the intermediate portions of the box between the wheel and axle assemblies.

Referring now to the embodiment of FIGURES 4 through 6, it will be seen that in general the structure is substantially similar to that shown in the previous embodiment. In the instant structure the grain box generally designated 100 is substantially semi-cylindrical comprising the bottom 101 and a pair of laterally spaced upwardly extending side portions 102. The box is composed of a plurality of overlapped arcuate panel segments 103 which are interconnected at their overlapped portions and secured to each other by means of bolts or rivets as shown at 104. The front and rear ends of the box are provided with front and rear panels 105 and 106, respectively, which are flanged with inwardly directed flanges 107 and 108 secured as by bolts or rivets 109 and 110, respectively, to the adjacent panels 103. In the instant construction the rigidifying backbone structure which is in substitution of the channel members 64 and 85 is the channel structure 112 which constitutes an auger trough, said channel structure 112 being bowed downwardly and having a bottom portion 113 and laterally spaced upstanding side portions 114, each of which is provided at its upper edge with an outturned flange 115 overlapping the adjacent lower marginal edge portion of the panels 103 and sceured thereto as by rivets 116. The trough 112 contains an auger 118 which extends the full length of the box and which is partially covered by means of a cover member 119 which is secured along one of the longitudinal edges of the trough to the bottom of the box and at its other edge is open as at 120 to admit the flow of granular material into the auger through slots 120 which are disposed at opposite sides of the cover. The auger has a center shaft 122, the forward end of which is journalled in a bearing 123 which is mounted on the front panel 105 and which connects through a universal joint 124 to a shafting 125 which is adapted to be connected to an associated power source such as the power take-off of an associated tractive vehicle. The rear end of the shaft 122 is connected through a gear train 127 to a sprocket chain drive assembly 128 which drives the auger 130 which is encased within a tube 131 which is adapted to swing about the shaft 128 for delivering the granular material upwardly through the housing 132 as the material is being fed rearwardly by the auger 118 through the opening 133 in the lower end of the housing 132. It will be understood that the auger structure generally designated 133 is swingable about a horizontal axis and is disposed behind the rear or front of the wagon so that it may be dumped either from the left or the right side of the wagon.

In the present instance the box is supported from front and rear wheel and axle assemblies which are identical with those described in the previous embodiment. The saddle members, however, are slightly modified in that they are substantially identical front and rear and are left and right and each comprises a bracket 140 which has an upper arcuate seating pad portion 141 against which the underside of the bottom portion of the box seats, the saddle 140 having an inner vertical leg portion 142 which joins with the upper side of the associated bolster and the outboard leg extending diagonally outwardly from the lower side of the box, the leg 144 having downwardly tapering sides 145 which converge to a width substantially equal to the width of the associated bolster.

Thus it will be seen that in each embodiment the box structure serves as the connecting medium between the front and rear wheel and axle assemblies and that the areas of connection between the bolsters and the box are so chosen as to exert and transmit torsional forces to the box and transmit the loads from the box to the bolster members. In each instance there is provided a channel-shaped reinforcement of the span of the box between the front and rear bolsters, in one instance the channel members being merely in the form of braces and in the other also serving the additional function of an auger trough stiffener means.

What is claimed is:

1. In a frameless wagon, a torsionally flexible box comprising a plurality of U-section segments disposed shingle fashion and joined together at adjacent ends and collectively forming a wagon body, each segment having a bottom and upstanding lateral portions terminating in upper edges, inturned flanges on said upper edges, said flanges having edges remote from the respective upper edges with dependent flanges forming with opposing portions of the lateral portion a channel rail for the upper edge of the box, said box having end panel structures, each structure including upper and lower parts, said upper part being channel shaped and having upper and lower flanges directed into the box and an intervening upright panel extending a substantial vertical depth from the top of the box, the upper flange being aligned planewise with the inturned flanges of the segments, the lower part of each end structure being complemental to the respective end of the box and having an upper edge with a flange extending beneath the lower flange of the respective upper portion and rigidifying the box therewith crosswise and vertically.

2. In a frameless wagon, a torsionally flexible box comprising a plurality of U-section segments disposed shingle fashion and joined together at adjacent ends and collectively forming a wagon body, each segment having a bottom and upstanding lateral portions terminating in upper edges, inturned flanges on said upper edges, said flanges having edges remote from the respective upper edges with dependent flanges forming with opposing portions of the lateral portion, a channel rail for the upper edge of the box, said box having end panel structures, each structure including upper and lower parts, said upper part being channel shaped and having upper and lower flanges directed into the box and an intervening upright panel extending a substantial vertical depth from the top of the box, the upper flange being aligned planewise with the inturned flanges of the segments, the lower part of each end structure being complemental to the respective end of the box and having an upper edge with a flange extending beneath the lower flange of the respective upper portion and rigidifying the box therewith crosswise and vertically and a wheel and axle assembly disposed in supporting relation to the box and including saddle structures connected to the assembly and the bottom of the box at opposite sides of the longitudinal axis thereof, and channel shaped structure extending medially along the bottom of the box in dependent relation to the bottom and providing a backbone resisting transverse collapse of the box.

3. In a frameless wagon, a torsionally flexible box comprising a plurality of U-section segments disposed shingle fashion and joined together at adjacent ends and collectively forming a wagon body, each segment having a bottom and upstanding lateral portions terminating in upper edges, inturned flanges on said upper edges, said flanges having edges remote from the respective upper edges with dependent flanges forming with opposing portions of the lateral portion, a channel rail for the upper edge of the box, said box having end panel structures, each structure including upper and lower parts, said upper part being channel shaped and having upper and lower flanges directed into the box and an intervening upright panel extending a substantial vertical depth from the top of the box, the upper flange being aligned planewise with the inturned flanges of the segments, the lower part of each end structure being complemental to the respective end of the box and having an upper edge with a flange extending beneath the lower flange of the respective upper portion and rigidifying the box therewith crosswise and vertically and a wheel and axle assembly disposed in supporting relation to the box and including saddle structures connected to the assembly and the bottom of the box at opposite sides of the longitudinal axis thereof, and a channel shaped structure comprising an upwardly open auger trough extending from one end to the other of the box.

4. In a frameless wagon, a torsionally flexible box comprising a plurality of U-section segments disposed shingle fashion and joined together at adjacent ends and collectively forming a wagon body, each segment having a bottom and upstanding lateral portions terminating in upper edges, inturned flanges on said upper edges, said flanges having edges remote from the respective upper edges with dependent flanges forming with opposing portions of the lateral portion, a channel rail for the upper edge of the box, said box having end panel structures, each structure including upper and lower parts, said upper part being channel shaped and having upper and lower flanges directed into the box and an intervening upright panel extending a substantial vertical depth from the top of the box, the upper flange being aligned planewise with the inturned flanges of the segments, the lower part of each end structure being complemental to the respective end of the box and having an upper edge with a flange extending beneath the lower flange of the respective upper portion and rigidifying the box therewith crosswise and vertically and a wheel and axle assembly disposed in supporting relation to the box and including saddle structures connected to the assembly and the bottom of the box at opposite sides of the longitudinal axis thereof, and said channel shaped structure including a pair of vertical gussets extending from an intermediate portion of each assembly toward the other and integrally joined with the bottom and having an interconnecting web between the gussets sloping upwardly from the related assembly to the bottom.

5. In a frameless wagon, a torsionally flexible U-section box having a bottom portion of single curvature and upstanding lateral portions of substantially uniform section extending substantially tangentially from opposite ends of the bottom and terminating in upper edges, means rigidifying said upper edges, end panel structures connected to the lateral and bottom portions at each end of the box, and wheel and axle assemblies disposed in supporting relation to the box and including saddle structures rigidly connected to each assembly and to the bottom portion of the box at opposite sides of the longitudinal axis thereof, and a channel-shaped structure comprising an upwardly open auger trough extending from one end to the other of the box and depending below said bottom portion and disposed on substantially the neutral axis of the box about which the box is torsionally flexible.

References Cited in the file of this patent

UNITED STATES PATENTS

| | | |
|---|---|---|
| 709,705 | Grosvenor et al. | Sept. 23, 1902 |
| 759,364 | Freeland | May 10, 1904 |
| 2,074,523 | Thwaits | Mar. 23, 1937 |
| 2,110,262 | Curtis | Mar. 8, 1938 |
| 2,537,219 | Girton | Jan. 9, 1951 |
| 2,729,313 | Ernestus | Jan. 3, 1956 |
| 2,792,231 | Compton | May 14, 1957 |

FOREIGN PATENTS

| | | |
|---|---|---|
| 338,343 | Italy | Mar. 31, 1936 |
| 689,928 | Great Britain | Apr. 8, 1953 |